US011042939B2

(12) United States Patent
Kroell et al.

(10) Patent No.: US 11,042,939 B2
(45) Date of Patent: Jun. 22, 2021

(54) METHODS FOR VEHICLE VALUATION UTILIZING AUTOMATED INTEGRATION OF BUILD SHEET DATA AND DEVICES THEREOF

(71) Applicant: Mitchell International, Inc., San Diego, CA (US)

(72) Inventors: Philip Kroell, Oro Valley, AZ (US); Michael Milliken, San Diego, CA (US); Joseph Riedesel, Cardiff, CA (US)

(73) Assignee: Mitchell International, Inc., San Diego, CA (US)

( * ) Notice: Subject to any disclaimer, the term of this patent is extended or adjusted under 35 U.S.C. 154(b) by 244 days.

(21) Appl. No.: 15/680,575

(22) Filed: Aug. 18, 2017

(65) Prior Publication Data

US 2018/0053256 A1 Feb. 22, 2018

Related U.S. Application Data

(60) Provisional application No. 62/376,696, filed on Aug. 18, 2016.

(51) Int. Cl.
*G06Q 40/08* (2012.01)
*G06Q 30/02* (2012.01)

(52) U.S. Cl.
CPC ......... *G06Q 40/08* (2013.01); *G06Q 30/0201* (2013.01)

(58) Field of Classification Search
CPC ..... G06Q 40/08; G06Q 30/0201; G06Q 30/02
See application file for complete search history.

(56) References Cited

U.S. PATENT DOCUMENTS 5,774,883 A * 6/1998 Andersen ............... G06Q 30/06
705/35
5,950,169 A * 9/1999 Borghesi ............ G06Q 30/0283
705/4

(Continued)

OTHER PUBLICATIONS

Mitchell International, "Mitchell Adds Vehicle-Specific Build Sheet Integration to Its VIN Decoder," Jun. 26, 2013, Marketwired, pp. 1-2 (Year: 2013).*

(Continued)

*Primary Examiner* — Kenneth Bartley
(74) *Attorney, Agent, or Firm* — Sheppard Mullin Richter & Hampton LLP (57) ABSTRACT

A method, non-transitory computer readable medium and apparatus for vehicle valuation includes integrating with an insurance claim application executed by an agent device in response to an electronic request for a claim for a vehicle. Automated valuation of the claim vehicle in the insurance claim application executed by an agent computing device is managed. Corresponding build sheet data from a build sheet data server device for the comparable vehicles and the vehicle based on a corresponding vehicle identifier for each is obtained. A comparable base value of each of the comparable vehicles to the claim vehicle is adjusted based on differences between the obtained build sheet data for each. A claim base value for the claim vehicle is determined based on the adjusted comparable base values for each of the identified comparable vehicles. The determined claim base value is set in the insurance claim application executed by the agent device.

8 Claims, 11 Drawing Sheets

(56) References Cited

U.S. PATENT DOCUMENTS

| | | | | |
|---|---|---|---|---|
| 7,152,778 | B2* | 12/2006 | Hartenstine | G06Q 10/087 235/375 |
| 7,383,203 | B1* | 6/2008 | Feldstein | G06Q 30/02 705/14.67 |
| 7,418,408 | B1* | 8/2008 | Heppe | G06Q 30/0639 705/26.3 |
| 7,596,512 | B1* | 9/2009 | Raines | G06Q 30/02 705/26.4 |
| 8,019,629 | B1 | 9/2011 | Medina, III et al. | |
| 8,160,904 | B1 | 4/2012 | Smith | |
| 8,260,639 | B1 | 9/2012 | Medina, III et al. | |
| 8,577,736 | B2* | 11/2013 | Swinson | G06Q 30/02 705/26.1 |
| 8,595,079 | B1* | 11/2013 | Raines | G06Q 30/0201 705/26.1 |
| 8,600,823 | B1* | 12/2013 | Raines | G06Q 30/02 705/26.1 |
| 8,612,314 | B2* | 12/2013 | Swinson | G06Q 30/0278 705/27.1 |
| 8,712,806 | B1 | 4/2014 | Medina, III et al. | |
| 8,725,581 | B2* | 5/2014 | Breed | G06Q 30/0627 382/104 |
| 8,725,584 | B1* | 5/2014 | Eager | G06Q 30/00 705/26.1 |
| 9,424,606 | B2* | 8/2016 | Wilson, II | G06Q 40/08 |
| 9,508,200 | B1* | 11/2016 | Mullen | G07C 5/008 |
| 9,646,345 | B1* | 5/2017 | Leise | G01M 17/00 |
| 9,684,934 | B1* | 6/2017 | Wilson, II | G06Q 40/08 |
| 9,697,503 | B1* | 7/2017 | Penilla | G06Q 10/20 |
| 9,704,141 | B2* | 7/2017 | Merg | G06F 16/285 |
| 9,721,400 | B1 | 8/2017 | Oakes, III et al. | |
| 9,741,066 | B2* | 8/2017 | Eager | G06Q 30/00 |
| 9,799,077 | B1* | 10/2017 | Wilson, II | G06Q 40/08 |
| 9,984,401 | B2* | 5/2018 | Taira | G06Q 30/0627 |
| 10,108,989 | B2* | 10/2018 | Swinson | G06Q 10/06 |
| 10,115,164 | B1* | 10/2018 | Binion | B60W 50/14 |
| 10,339,728 | B1 | 7/2019 | Oakes, III et al. | |
| 10,372,953 | B1* | 8/2019 | Bondarenko | G06K 7/10722 |
| 10,373,262 | B1* | 8/2019 | Haller, Jr. | G06K 9/00671 |
| 10,380,654 | B2* | 8/2019 | Hirtenstein | G06Q 30/0283 |
| 10,410,439 | B1 | 10/2019 | Gingrich et al. | |
| 10,510,142 | B1 | 12/2019 | Dohner et al. | |
| 2002/0007289 | A1* | 1/2002 | Malin | G06Q 10/06 705/4 |
| 2002/0016655 | A1* | 2/2002 | Joao | G07C 5/008 701/33.4 |
| 2002/0032626 | A1* | 3/2002 | DeWolf | G06Q 10/06 705/35 |
| 2002/0169640 | A1* | 11/2002 | Freeland | G06Q 30/06 705/4 |
| 2003/0055812 | A1* | 3/2003 | Williams | G06F 16/904 |
| 2003/0200151 | A1* | 10/2003 | Ellenson | G06Q 30/0278 705/306 |
| 2005/0086070 | A1* | 4/2005 | Engelman | G06Q 10/087 705/28 |
| 2005/0108112 | A1* | 5/2005 | Ellenson | G06Q 30/0278 705/306 |
| 2005/0267774 | A1* | 12/2005 | Merritt | G06Q 10/0637 705/306 |
| 2006/0155614 | A1* | 7/2006 | Woytowick | G06Q 30/00 705/4 |
| 2007/0027750 | A1* | 2/2007 | Chou | G06Q 30/02 705/14.55 |
| 2007/0162347 | A1* | 7/2007 | King | G06Q 30/0601 705/26.1 |
| 2008/0103942 | A1* | 5/2008 | Shernaman | G06Q 10/087 705/28 |
| 2008/0281658 | A1* | 11/2008 | Siessman | G06Q 10/00 705/302 |
| 2009/0150200 | A1* | 6/2009 | Siessman | G06Q 10/0631 705/7.12 |
| 2010/0088158 | A1* | 4/2010 | Pollack | G06Q 30/02 705/7.35 |
| 2010/0299161 | A1* | 11/2010 | Burdick | G06Q 10/087 705/4 |
| 2011/0202471 | A1* | 8/2011 | Scott | G06Q 30/02 705/306 |
| 2011/0270707 | A1* | 11/2011 | Breed | G06Q 30/0627 705/26.63 |
| 2011/0313936 | A1* | 12/2011 | Sieger | G06Q 10/083 705/306 |
| 2012/0109660 | A1* | 5/2012 | Xu | G06Q 10/06 705/1.1 |
| 2012/0123951 | A1* | 5/2012 | Hyatt | G06Q 10/10 705/305 |
| 2013/0268298 | A1* | 10/2013 | Elkins | G06Q 40/00 705/4 |
| 2014/0039935 | A1* | 2/2014 | Rivera | G06Q 40/08 705/4 |
| 2014/0041047 | A1* | 2/2014 | Jaye | G06F 21/6245 726/27 |
| 2014/0277916 | A1* | 9/2014 | Mullen | G06Q 40/08 701/31.4 |
| 2014/0279169 | A1* | 9/2014 | Leos | G06Q 30/0611 705/26.4 |
| 2014/0279171 | A1* | 9/2014 | Burgiss | G06Q 30/0611 705/26.4 |
| 2014/0279229 | A1* | 9/2014 | Burgiss | G06Q 30/0629 705/26.41 |
| 2014/0279275 | A1* | 9/2014 | Burgiss | G06Q 30/0635 705/26.81 |
| 2015/0106133 | A1* | 4/2015 | Smith, Jr. | G06Q 40/08 705/4 |
| 2015/0242926 | A1* | 8/2015 | Taira | G06Q 30/0627 705/26.63 |
| 2015/0324924 | A1* | 11/2015 | Wilson | G06Q 40/08 705/4 |
| 2015/0332407 | A1* | 11/2015 | Wilson, II | G06Q 40/08 705/4 |
| 2015/0363838 | A1* | 12/2015 | Wu | G06Q 30/0278 705/306 |
| 2015/0371262 | A1* | 12/2015 | Anspach | G06Q 30/0256 705/14.54 |
| 2016/0012539 | A1* | 1/2016 | Gorelov | G06Q 40/08 705/4 |
| 2016/0239921 | A1* | 8/2016 | Bray | G06Q 40/08 |
| 2016/0252898 | A1* | 9/2016 | Sahadeo | G05B 19/4183 700/116 |
| 2017/0091289 | A1* | 3/2017 | Ohazulike | G06Q 50/01 |
| 2017/0132578 | A1* | 5/2017 | Merg | G06F 16/285 |
| 2018/0025392 | A1* | 1/2018 | Helstab | G06Q 30/0278 705/306 |
| 2018/0053256 | A1* | 2/2018 | Kroell | G06Q 30/0201 |
| 2018/0108189 | A1* | 4/2018 | Park | G07C 5/008 |
| 2018/0155057 | A1* | 6/2018 | Irish | G08G 1/205 |
| 2019/0130671 | A1* | 5/2019 | Dillow | G07C 5/0841 |
| 2019/0287162 | A1* | 9/2019 | Ismail | G06Q 30/08 |

OTHER PUBLICATIONS

Mitchell and J.D. Power, "Vehicle Valuation Report," 2011, Mitchell International, pp. 1-7. (Year: 2011).*

Mitchell, "Mitchell WorkCenter Total Loss," 2012, Mitchell International, pp. 1-6. (Year: 2012).*

Mitchell Build Sheet, "Build Sheet Data Now Added to Mitchell WorkCenter Total Loss," 2013, Mitchell International, p. 1. (Year: 2013).*

Mitchell Integrates Comparable Build Sheet Data into the WorkCenter Total Loss Solution, Jun. 14, 2016, https://www.mitchell.com/mitchellnews/detail/lid/1409/category, pp. 1-2. (Year: 2016).*

* cited by examiner

| 12 | 2009 DODGE CHALLENGER SE 2D CPE 6 3.5 HO_ NORMAL GAS A2WD | | LIST PRICE $15,650.00 | |
|---|---|---|---|---|
| | | ADJUSTMENTS | LOSS VEHICLE | THIS VEHICLE | AMOUNT |

| | ADJUSTMENTS | LOSS VEHICLE | THIS VEHICLE | AMOUNT |
|---|---|---|---|---|
| VIN: 2B3LJ44V49H526827 | PROJECTED SOLD ADJUSTMENT | | | -$823.00 |
| STOCK NO.: PU4282 | AGE OF AD ADJUSTMENT | | | -$101.32 |
| LISTING DATE.: 02/19/2016 | MILEAGE | 57,000 | 68,339 | $806.99 |
| ZIP/POSTAL CODE: 21801 | EQUIPMENT | | | |
| DISTANCE FROM LOSS VEHICLE: 171 MILES | LEATHER INTERIOR GROUP | YES | NO | $570.53 |
| SOURCE: DEALER WEB LISTING - TRUECAR.COM | AM/FM STEREO W/6-DISC CD/DVD/MP3 CHANGER | YES | NO | $233.55 |
| SHERWOOD CHRYSLER JEEP DODGE RAM | PWR SUNROOF | YES | NO | $633.91 |
| 1915 N SALISBURY BLVD | MYGIG MULTIMEDIA SYSTEM W/NAVIGATION | NO | YES | -$1,134.38 |
| SALISBURY MD 21801 | | | TOTAL ADJUSTMENTS: | $186.28 |
| 410-749-1301 | | | ADJUSTED PRICE: | $15,836.28 |

COMPARABLE VEHICLE OPTION DETAILS:
MYGIG MULTIMEDIA SYSTEM W/NAVIGATION

FIG. 4

| 11 | 2009 DODGE CHALLENGER SE 2D CPE 6 3.5 HO_ NORMAL GAS A2WD | | LIST PRICE $15,650.00 | |
|---|---|---|---|---|
| VIN: | 2B3LJ44V49H526827 | ADJUSTMENTS | LOSS VEHICLE THIS VEHICLE | AMOUNT |
| STOCK NO: | PU4282 | PROJECTED SOLD ADJUSTMENT | | -$823.00 |
| LISTING DATE: | 02/19/2016 | AGE OF AD ADJUSTMENT | | -$101.32 |
| ZIP/POSTAL CODE: | 21801 | MILEAGE | 57,000    68,339 | $806.99 |
| DISTANCE FROM LOSS VEHICLE: | 171 MILES | EQUIPMENT | | |
| SOURCE: | DEALER WEB LISTING - BUILDSHEET - TRUECAR.COM | LEATHER INTERIOR GROUP | YES    NO | $570.53 |
| | TEMPLE HILLS USED CAR | PWR SUNROOF | YES    NO | $633.91 |
| | 4706 BARNABAS ROAD | | TOTAL ADJUSTMENTS: | $1087.11 |
| | TEMPLE HILLS MD 20748 | | ADJUSTED PRICE: | $16,737.11 |
| | 301-702-9000 | | | |

COMPARABLE VEHICLE OPTION DETAILS:
AM/FM STEREO W/6-DISC CD/DVD/MP3 CHANGER

FIG. 5

| 2 | 2004 CHRYSLER TOWN & COUNTRY TOURING PASSENGER VAN 6 3.8 NORMAL GAS A 2WD | | LIST PRICE $4,995.00 | |
|---|---|---|---|---|
| VIN : | 2C4GP54L34R561168 | | | |
| STOCK NO : | 10045 | ADJUSTMENTS | LOSS VEHICLE | THIS VEHICLE | AMOUNT |
| LISTING DATE : | 03/17/2016 | PROJECTED SOLD ADJUSTMENT | | | -$593.00 |
| ZIP/POSTAL CODE : | 30253 | VEHICLE CONFIGURATION ADJUSTMENT | | | $801.77 |
| DISTANCE FROM LOSS VEHICLE : | 34 MILES | MILEAGE | 142,000 | 140,052 | -$36.49 |
| SOURCE : | DEALER WEB LISTING - TRUECAR.COM | EQUIPMENT | | | |
| | AUTOWORLD CAR SALES | TRAILER TOW GROUP | YES | NO | $69.03 |
| | 116 INDUSTRIAL BOULEVARD | LEATHER INTERIOR GROUP | NO | YES | -$303.44 |
| | MCDONOUGH GA 30253 | PWR SUNROOF | YES | NO | $123.54 |
| | 687-782-7941 | REAR SEAT VIDEO SYSTEM | YES | NO | $123.54 |
| | | 6-DISC IN-DASH CD/DVD CHANGER | NO | YES | -$80.20 |
| | | | | TOTAL ADJUSTMENTS : | $124.75 |
| | | | | ADJUSTED PRICE : | $5,119.75 |

COMPARABLE VEHICLE PACKAGE DETAILS :
LEATHER INTERIOR GROUP
COMPARABLE VEHICLE OPTION DETAILS :
6-DISC IN-DASH CD/DVD CHANGER

FIG. 6

| LOSS VEHICLE: 2004 CHRYSLER TOWN & COUNTRY LIMITED 4 DOOR PASSENGER VAN 119" WB 3.8L 6 CYL GAS A FWD | | | | |
|---|---|---|---|---|
| COMPARABLE VEHICLES | | | | |
| 1 | 2004 CHRYSLER TOWN & COUNTRY TOURING PASSENGER VAN 6 3.8 NORMAL GAS A 2WD | | LIST PRICE $4,995.00 | |
| VIN: 2C4GP54L34R561168 | ADJUSTMENTS | LOSS VEHICLE | THIS VEHICLE | AMOUNT |
| STOCK NO.: 10045 | PROJECTED SOLD ADJUSTMENT | | | -$593.00 |
| LISTING DATE: 03/17/2016 | AGE OF AD ADJUSTMENT | | | -$19.33 |
| ZIP/POSTAL CODE: 30253 | VEHICLE CONFIGURATION ADJUSTMENT | | | $801.77 |
| DISTANCE FROM LOSS VEHICLE: 34 MILES | MILEAGE | 142,000 | 140,052 | -$36.49 |
| SOURCE: DEALER WEB LISTING - BUILDSHEET - TRUECAR.COM | EQUIPMENT | | | |
| GA 30060 | TRAILER TOW GROUP | YES | NO | $89.03 |
| 844-749-0754 | PREMIUM GROUP | NO | YES | -$79.47 |
| | PLATINUM SERIES QUICK-ORDER PKG | NO | YES | -$606.15 |
| | REAR SEAT VIDEO SYSTEM | YES | YES | $123.54 |
| | | | TOTAL ADJUSTMENTS: | -$320.10 |
| | | | ADJUSTED PRICE: | $4,674.90 |

COMPARABLE VEHICLE PACKAGE DETAILS:
PREMIUM GROUP (PWR ADJUSTABLE PEDALS)
PLATINUM SERIES QUICK-ORDER PKG (6-DISC IN-DASH CD/DVD CHANGER, REAR SEAT VIDEO SYTEM)
COMPARABLE VEHICLE OPTION DETAILS
PWR SUNROOF

FIG. 7

| LOSS VEHICLE 2003 CHEVROLET IMPALA 4 DOOR SEDAN 3.4L 6 CYL GAS A FWD | | | | |
|---|---|---|---|---|
| COMPARABLE VEHICLES | | | | |
| 1 | 2003 CHEVROLET IMPALA BASE 4D SDN 6 3.4 NORMAL GAS A 2WD | | LIST PRICE $3,888.00 | |

| VIN: | 2G1WF52E239407674 |
|---|---|
| STOCK NO.: | |
| LISTING DATE: | 03/06/2016 |
| ZIP/POSTAL CODE: | 54914 |
| DISTANCE FROM LOSS VEHICLE: | 32 MILES |
| SOURCE: | DEALER WEB LISTING - AUTOTRADER.COM |
| | APPLETON MOTORCARS |
| | 1221 W WISCONSIN AVE |
| | APPLETON WI 54914 |
| | 920-968-0399 |

| ADJUSTMENTS | LOSS VEHICLE | THIS VEHICLE | AMOUNT |
|---|---|---|---|
| PROJECTED SOLD ADJUSTMENT | | | -$596.00 |
| MILEAGE | 136,000 | 149,000 | $150.64 |
| EQUIPMENT | | | |
| PREFERRED EQUIPMENT GROUP (1SB) | YES | NO | $210.34 |
| SEAT ADJUSTER, POWER, DRIVER 6-WAY | YES | NO | $50.56 |
| WHEELS, 16" (40.6 CM) ALUMINUM, CUSTOM | YES | NO | $54.45 |
| TOTAL ADJUSTMENTS: | | | -$130.01 |
| ADJUSTED PRICE: | | | $3,757.99 |

COMPARABLE VEHICLE OPTION DETAILS :
MIRROR GROUP

FIG. 8

☐ COMPARABLE VEHICLES

LOSS VEHICLE 2003 CHEVROLET IMPALA 4 DOOR SEDAN 3.4L 6 CYL GAS A FWD

COMPARABLE VEHICLES

| 1 | 2003 CHEVROLET IMPALA BASE 4D SDN 6 3.4 NORMAL GAS A 2WD | | LIST PRICE $3,777.00 | |
|---|---|---|---|---|

| VIN: | 2G1WF52E239407674 |
|---|---|
| STOCK NO: | |
| LISTING DATE: | 03/27/2016 |
| ZIP/POSTAL CODE: | 54914 |
| DISTANCE FROM LOSS VEHICLE: | 32 MILES |
| SOURCE: | DEALER WEB LISTING - BUILD SHEET - AUTOTRADER.COM |
| | APPLETON MOTORCARS |
| | 1221 W WISCONSIN AVE |
| | APPLETON WI 54914 |
| | 920-968-0399 |

| ADJUSTMENTS | LOSS VEHICLE | THIS VEHICLE | AMOUNT |
|---|---|---|---|
| PROJECTED SOLD ADJUSTMENT | | | -$579.00 |
| AGE OF AD ADJUSTMENT | | | -$2.35 |
| MILEAGE | 136,000 | 149,000 | $146.34 |
| EQUIPMENT | | | |
| MIRROR GROUP | YES | NO | $24.94 |
| SEAT ADJUSTER, POWER, DRIVER 6-WAY | YES | NO | $49.12 |
| WHEELS, 16" (40.6 CM) ALUMINUM, CUSTOM | YES | NO | $52.90 |
| BRAKES, 4-WHEEL ANTILOCK, 4-WHEEL DISC | NO | YES | -$90.68 |
| | | TOTAL ADJUSTMENTS: | -$398.73 |
| | | ADJUSTED PRICE: | $3,378.27 |

COMPARABLE VEHICLE PACKAGE DETAILS:
PREFERRED EQUIPMENT GROUP (1SB) (FLOORMATS, FRONT & REAR, CRUISE CONTROL, ELETRONIC W/SET & RESUME SPEED, SOUND SYSTEM, ETR AM/FM STEREO W/CD PLAYER)
COMPARABLE VEHICLE OPTION DETAILS
BRAKES, 4-WHEEL ANTILOCK, 4-WHEEL DISC

FIG. 9

Build Sheet / Comparable Vehicles: Dealer Advertisement Example

Comparable Vehicle 2: 2013 FORD ESCAPE TITANIUM 4D SUV 4 2 TURBO GAS A4WD

VIN: 1FMCU9J95DUB63773 - The advertisement below for comparable vehicle 2 as entered by the Dealer does not list the PWR PANORAMA ROOF as part of the comparable vehicles equipment.

Comp2(20160404_tcc_attributes):

|127945A|2013|Ford|Escape|Titanium 4WD|1FMCU9J95DUB63773|SPORT UTILITY|4 Cyl 2.0L Turbocharged Gas|4WD|Automatic - 6 Speed Shiftable|White Platinum Metallic Tri-Coat|Charcoal Black|SYNC - Satellite Communications,Real Time Traffic,Memorized Settings Includes Exterior Mirrors,Impact Sensor Post-Collision Safety System,Roll Stability Control,Phone Wireless Data Link Bluetooth,Multi-Function Display,Security Anti-Theft Alarm System,Electronic Messaging Assistance With Read Function,Memorized Settings Number Of Drivers: 2,Memorized Settings Includes Driver Seat,Stability Control Electronic,Steering Wheel Mounted Controls Voice Recognition Controls,Emergency Braking Assist,Windows Rear Defogger,Suspension Front Shock Type: Gas Shock Absorbers,Windows Lockout Button,Windows Rear Wiper: Dual Speed,Suspension Stabilizer Bar(s): Rear,Suspension Stabilizer Bar(s): Front,Windows Front Wipers: Variable Intermittent,Windows Privacy Glass,Suspension Front Arm Type: Lower Control Arms,Suspension Front Spring Type: Coil Springs,Suspension Rear Coil Springs,Suspension Rear Gas Shock Absorbers,Power Windows,Exterior Mirrors Heated,Front Headrests Adjustable,Rear Seats Rear Heat: Vents,Front Suspension Type: Macpherson Struts,Programmable Safety Key MyKey,One-Touch Windows: 4,Warnings And Reminders Maintenance Reminder,Front Fog lights,Seatbelts Seatbelt Pretensioners: Front,Tachometer,Passenger Seat Adjustable Lumbar Support: Power,Rear Spoiler Color Body-Color, Warnings And Reminders Low Oil Level,Exterior Mirrors Manual Folding,Security Perimeter Alarm,Digital Odometer,Seats Front Seat Type: Sport,Exterior Mirrors Integrated Turn Signals,Rear Seats 60-40 Split Bench,Inside Rearview Mirror Auto-Dimming,Body Side Reinforcements Side Impact Door Beams,Rear Bumper Color Body-Color,Passenger Seat Heated,Seatbelts Second Row 3-Point,Traction Control,Vanity Mirrors Dual Illuminating,Front Suspension Classification: Independent,Front Seatbelts: 3-Point,Headlights Halogen,Seatbelts Seatbelt Warning Sensor: Driver And Passenger,Security Engine Immobilizer,Headlights Auto On/Off,Exterior Mirrors Power,Exterior Mirrors Spotter Mirror,Seatbelts Seatbelt Force Limiters: Front,Power Door Locks,Mirror Color Body-Color,Rear Seats Split Folding,Passenger Seat Power Adjustments: Recline,Exterior Entry Lights Puddle Lamps,Headlights Auto Delay Off,Seats Premium Leather Upholstery,Passenger Seat Height Adjustable,Passenger Seat Power Adjustments: 10,Warnings And Reminders Low Fuel Level,Rear Seats Reclining,External Temperature Display,Rear Seats Flat Folding,Rear Spoiler Roofline Spoiler,Trip Odometer,Doors Rear Door Type: Power Liftgate,Driver Seat Power Adjustments: Recline,Doors Liftgate Window: Manual Flip-Up,Overhead Console,Keyless Entry Keypad,Cargo Area 12V Power Outlet,Front 12V Power Outlet(s),Remote Engine Start,Driver Seat Height Adjustable,Engine Push-Button Start,Storage Cargo Tie-Down Anchors And Hooks,Drivetrain 4WD Type: On Demand,Multi-function Remote Keyless Entry,Driver Seat Power Adjustments: 10,Driver Seat Adjustable Lumbar Support: Power,Universal Garage Door Opener,Power Steering,Steering Wheel Mounted Controls Cruise Controls,Multi-fun|36934|22900.0||68138|Omaha|NE||Baxter Ford South||9203 S 145th Street|(402) 896-6000|5435|U|02/28/16

FIG. 10

| 2 | 2013 FORD ESCAPE TITANIUM 4D SUV 4 2 TURBO GAS A4WD | | LIST PRICE: $22,900.00 | |
|---|---|---|---|---|
| | | ADJUSTMENTS | LOSS VEHICLE THIS VEHICLE | AMOUNT |
| VIN: | 1FMCU9J95DUB63773 | PROJECTED SOLD ADJUSTMENT | | -$1,228.00 |
| STOCK NO: | 127945A | MILEAGE | 54,297   36,934 | -$1,524.66 |
| LISTING DATE: | 04/04/2016 | EQUIPMENT | | |
| ZIP/POSTAL CODE: | 68138 | (4) ALL-WEATHER FLOOR MATS | YES   NO | $50.60 |
| DISTANCE FROM LOSS VEHICLE: | 30 MILES | CHARCOAL BLACK, LEATHER-TRIMMED SEAT TRIM | YES   NO | $603.87 |
| SOURCE: | DEALER WEB LISTING - VAST.COM | NAVIGATION | YES   NO | $536.40 |
| | PERFORMANCE FORD | PWR PANORAMA ROOF | YES   NO | $941.24 |
| | 9203 SOUTH 145TH STREET | | TOTAL ADJUSTMENTS: | -$620.55 |
| | OMAHA NE 68138 | | ADJUSTED PRICE: | $22,279.45 |
| | 402-896-6000 | | | |

FIG. 11

METHODS FOR VEHICLE VALUATION UTILIZING AUTOMATED INTEGRATION OF BUILD SHEET DATA AND DEVICES THEREOF

This application claims the benefit of U.S. Provisional Patent Application Ser. No. 62/376,696, filed Aug. 18, 2016, which is hereby incorporated by reference in its entirety.

FIELD

This technology generally relates to methods for vehicle valuation utilizing automated integration of build sheet data for insurance claims and devices thereof.

BACKGROUND

Prior automated software appraisal technologies for determining vehicle valuations have developed automated techniques which identified and utilized vehicle advertisements of comparable vehicles to determine a vehicle valuation for a particular insurance claim. In particular, these prior automated software appraisal technologies have identified and then extracted vehicle information for comparable vehicles, such as data on make, model, year, specific configuration, trim level of a vehicle, optional equipment, and packages when available, from vehicle advertisements. Additionally, these prior automated software appraisal technologies have used this data on extracted vehicle information to identify comparable vehicles and then when conducting automated appraisals have adjusted the values of those comparable vehicles using the data on extracted vehicle information to determine a vehicle valuation.

Figure 11:
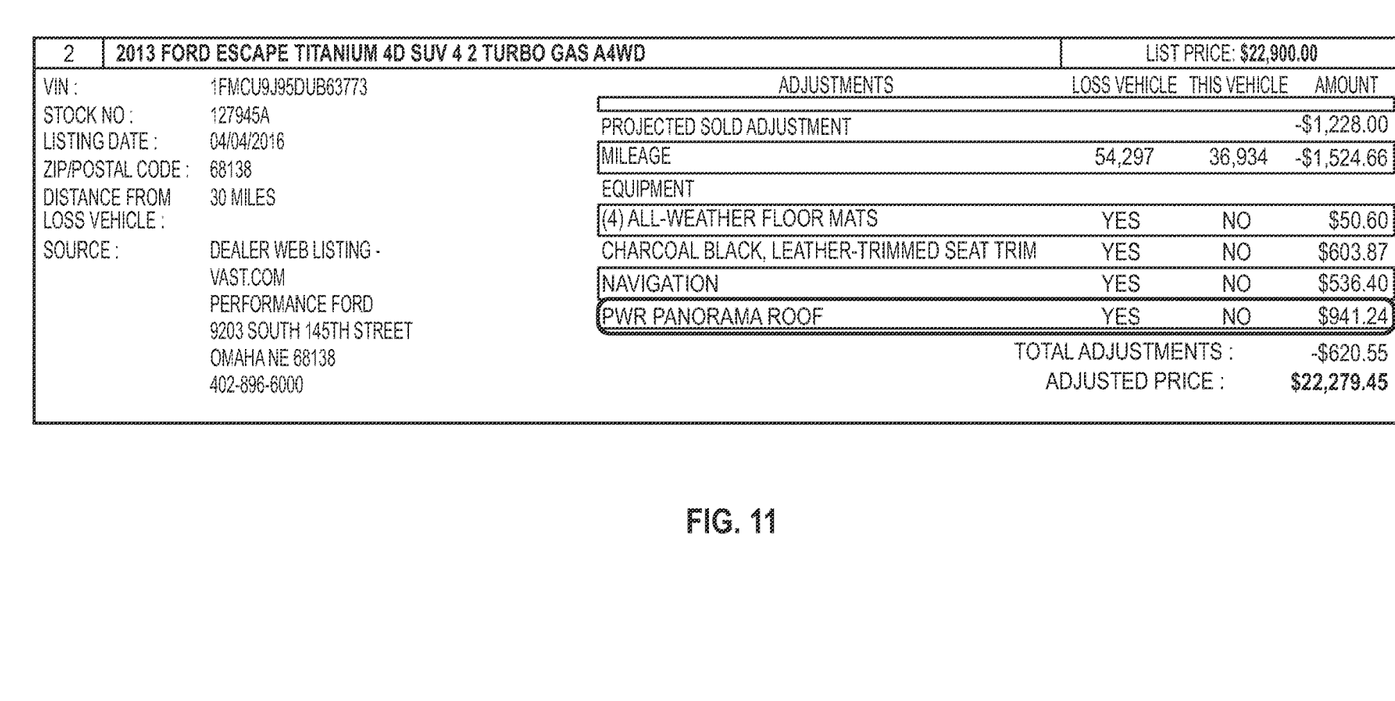
FIG. 11 is a diagram of a fourth example of a valuation of a comparable vehicle using a prior process based on the advertisement data.

Although this automation of the appraisal process has helped to streamline the claims process, unfortunately the extracted data from vehicle advertisements may be incomplete and/or inaccurate. By way of example, as illustrated in FIG. 10 an example of advertisement data for a comparable vehicle for a, "2013 FORD ESCAPE TITANIUM 4D SUV 4 2 TURBO GAS A4WD" is shown. Although this advertisement data which is extracted by the prior automated appraisal process appears to be comprehensive, this potential comparable vehicle in this advertisement has a power panoramic sunroof which is not listed in the advertisement data. As a result, as illustrated in FIG. 11 the prior automated valuation process, which is based on the extracted advertisement data, is unable to determine that the advertisement data is incomplete, and incorrectly applies an adjustment in the amount of $941.24 to the price of comparable vehicle, i.e. the "2013 FORD ESCAPE TITANIUM 4D SUV 4 2 TURBO GAS A4WD", for not being equipped with the PWR PANORAMA ROOF. Accordingly, as illustrated by this example this extraction and processing of vehicle information from advertisement data has at times been inaccurate and incomplete and also has resulted in the use of vehicles which would not be considered to be comparable. To date there has been no technological solution to address this issue in automated appraisals for identifying these errors and also for identifying and eliminating the use of vehicles which are not comparable.

SUMMARY

A method for vehicle valuation utilizing automated integration of build sheet data includes integrating, by a valuation management computing apparatus, with at least one insurance claim application executed by an agent computing device in response to a received electronic request for a claim for a vehicle. Automated valuation of the claim vehicle in the insurance claim executed by an agent computing device is managed, by the valuation management computing apparatus. Corresponding build sheet data from one or more build sheet data server devices for each of one or more comparable vehicles and the claim vehicle based on a corresponding vehicle identifier for each of the one or more comparable vehicles and the claim vehicle is obtained, by the valuation management computing apparatus. A comparable base value of each of the one or more comparable vehicles to the claim vehicle is adjusted, by the valuation management computing apparatus, based on differences between the obtained build sheet data for each of the one or more comparable vehicles and the claim vehicle. A claim base value for the claim vehicle is determined, by the valuation management computing apparatus, based on the one or more adjusted comparable base values for each of the identified comparable vehicles. The determined claim base value for the claim vehicle is set, by the valuation management computing apparatus, in the insurance claim application executed by the agent computing device.

A non-transitory computer readable medium having stored thereon instructions for vehicle valuation utilizing automated integration of build sheet data, comprising executable code, which when executed by at least one processor, cause the processor to integrate with at least one insurance claim application executed by an agent computing device in response to a received electronic request for a claim for a vehicle. Automated valuation of the claim vehicle in the insurance claim executed by an agent computing device is managed. Corresponding build sheet data from one or more build sheet data server devices for each of one or more comparable vehicles and the claim vehicle based on a corresponding vehicle identifier for each of the one or more comparable vehicles and the claim vehicle is obtained. A comparable base value of each of the one or more comparable vehicles to the claim vehicle is adjusted based on differences between the obtained build sheet data for each of the one or more comparable vehicles and the claim vehicle. A claim base value for the claim vehicle is determined based on the one or more adjusted comparable base values for each of the identified comparable vehicles. The determined claim base value for the claim vehicle is set in the insurance claim application executed by the agent computing device.

A valuation management computing apparatus includes a memory coupled to the processor which is configured to be capable of executing programmed instructions comprising and stored in the memory to integrate with at least one insurance claim application executed by an agent computing device in response to a received electronic request for a claim for a vehicle. Automated valuation of the claim vehicle in the insurance claim executed by an agent computing device is managed. Corresponding build sheet data from one or more build sheet data server devices for each of one or more comparable vehicles and the claim vehicle based on a corresponding vehicle identifier for each of the one or more comparable vehicles and the claim vehicle is obtained. A comparable base value of each of the one or more comparable vehicles to the claim vehicle is adjusted based on differences between the obtained build sheet data for each of the one or more comparable vehicles and the claim vehicle. A claim base value for the claim vehicle is determined based on the one or more adjusted comparable base values for each of the identified comparable vehicles.

The determined claim base value for the claim vehicle is set in the insurance claim application executed by the agent computing device.

Accordingly, this technology provides methods, non-transitory computer readable medium, and apparatuses that generate more accurate, productive and efficient vehicle valuations. With this technology, prior errors associated with automated vehicle valuations based on extracted data from vehicle advertisements from online sources are eliminated. In particular, the automated identification and integration of the build sheet data with this technology, which is not routine or conventional in this technology space, allows for more accurate identification of comparable vehicles and allows for more accurate adjustments to the value of those comparable vehicles.

BRIEF DESCRIPTION OF THE DRAWINGS

FIG. 10 is an example of advertisement data for a comparable vehicle which is missing identification of a "PWR PANORAMA ROOF" as part of the comparable vehicle data.

DETAILED DESCRIPTION

Figure 1:
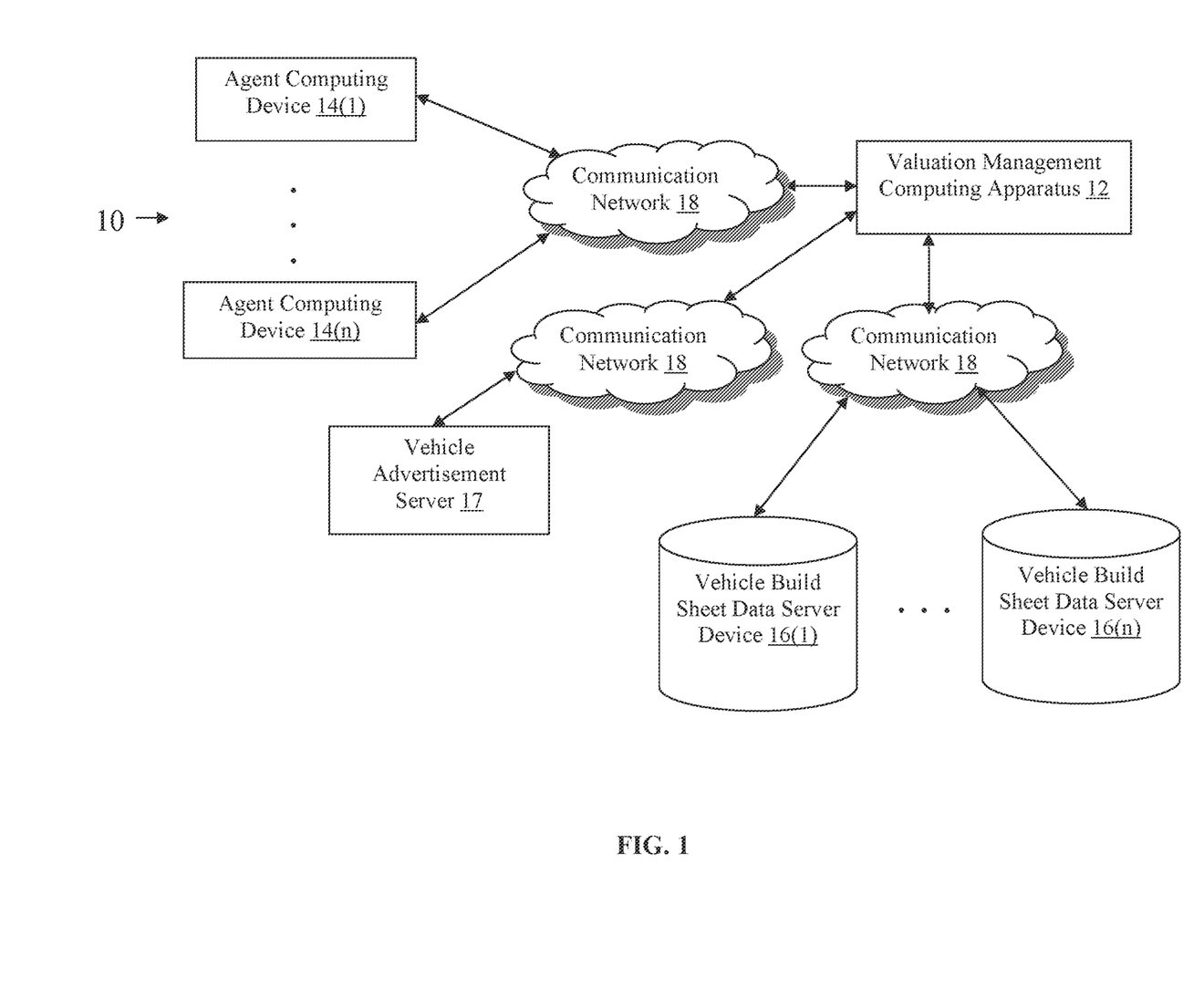
FIG. 1 is a block diagram of an environment with an example of a valuation management computing apparatus that improves accuracy of automated vehicle valuation.
Figure 2:
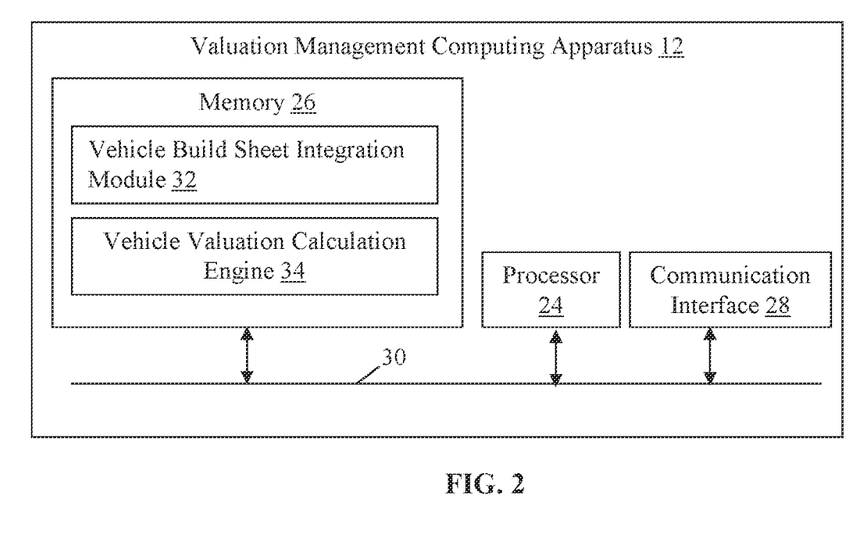
FIG. 2 is a block diagram of the example of the valuation management computing apparatus shown in FIG. 1.

An environment 10 with an example of a valuation management computing apparatus 12 is illustrated in FIGS. 1-2. In this particular example, the environment 10 includes the valuation management computing apparatus 12, agent or other client computing devices 14(1)-14(n), vehicle build sheet data server devices 16(1)-16(n) coupled via one or more communication networks 18, although the environment could include other types and numbers of systems, devices, components, and/or other elements as is generally known in the art and will not be illustrated or described herein. This technology provides a number of advantages including providing methods, non-transitory computer readable medium, and apparatuses that provide more accurate, productive and efficient vehicle valuations.

Referring more specifically to FIGS. 1-2, the valuation management computing apparatus 12 is programmed to increase the accuracy of vehicle valuation through the automated identification and integration of build sheet data, although the apparatus can perform other types and/or numbers of functions or other operations and this technology can be utilized with other types of claims. In this particular example, the valuation management computing apparatus 12 includes a processor 24, a memory 26, and a communication interface 28 which are coupled together by a bus 30, although the valuation management computing apparatus 12 may comprise other types and/or numbers of physical and/or virtual systems, devices, components, and/or other elements in other configurations.

The processor 24 in the valuation management computing apparatus 12 may execute one or more programmed instructions stored in the memory 26 for improving the accuracy of automated vehicle valuations as illustrated and described in the examples herein, although other types and numbers of functions and/or other operations can be performed. The processor 24 in the valuation management computing apparatus 12 may include one or more central processing units and/or general purpose processors with one or more processing cores, for example.

The memory 26 in the valuation management computing apparatus 12 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 24, can be used for the memory 26. In this particular example, the memory 26 includes a vehicle build sheet integration module 32 and a vehicle valuation calculation engine 34, although the memory 26 can comprise other types and/or numbers of other modules, programmed instructions and/or data. Examples of the programmed instructions of the vehicle build sheet integration module 32 to automate identify and extract manufacturer vehicle build sheet data corresponding to a vehicle in a particular insurance claims and the vehicle valuation calculation engine 34 to determine a vehicle valuation through the automated integration of corresponding vehicle build sheet data along with other functions and/or operations are illustrated and described by way of the examples herein.

The communication interface 28 in the valuation management computing apparatus 12 operatively couples and communicates between one or more of the agent computing devices 14(1)-14(n) and one or more of the vehicle build sheet data server devices 16(1)-16(n), which are all coupled together by one or more of the communication networks 18, although other types and numbers of communication networks or systems with other types and numbers of connections and configurations to other devices and elements. By way of example only, the communication networks 18 can use TCP/IP over Ethernet and industry-standard protocols, including NFS, CIFS, SOAP, XML, LDAP, SCSI, and SNMP, although other types and numbers of communication networks, can be used. The communication networks 18 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like.

In this particular example, each of the agent computing devices 14(1)-14(n) may submit requests for vehicle valuations associated with an insurance claim which require an automated vehicle valuation by the valuation management computing apparatus 12, although the requests for vehicle valuations can be obtained by the valuation management computing apparatus 12 in other manners and/or from other sources. Each of the agent computing devices 14(1)-14(n) may include a processor, a memory, user input device, such as a keyboard, mouse, and/or interactive display screen by way of example only, a display device, and a communication interface, which are coupled together by a bus or other link, although each may have other types and/or numbers of other systems, devices, components, and/or other elements.

The vehicle build sheet data server devices 16(1)-16(n) may store and provide manufacturer vehicle build sheet data, such as make, model, year, specific configuration, trim level of a vehicle, optional equipment, and packages when available of a vehicle, by way of example only, to the valuation management computing apparatus 12 via one or more of the communication networks 18, for example, although other types and/or numbers of storage media in other configurations could be used. The vehicle advertisement server 17 may store vehicle advertisement information for possible comparable vehicles, although other types and/or numbers of other systems, devices, components and/or other elements may store information on possible comparable vehicles. In this particular example, each of the vehicle build sheet data server devices 16(1)-16(n) and the vehicle advertisement server 17 may comprise various combinations and types of storage hardware and/or software and represent a system with multiple network server devices in a data storage pool, which may include internal or external networks. Various network processing applications, such as CIFS applications, NFS applications, HTTP Web Network server device applications, and/or FTP applications, may be operating on the vehicle build sheet data server devices 16(1)-16(n) and may transmit data in response to requests from the valuation management computing apparatus 12. Each the vehicle build sheet data server devices 16(1)-16(n) and the vehicle advertisement server 17 may include a processor, a memory, and a communication interface, which are coupled together by a bus or other link, although each may have other types and/or numbers of other systems, devices, components, and/or other elements.

Although the exemplary network environment 10 with the valuation management computing apparatus 12, the agent computing devices 14(1)-14(n), the vehicle build sheet data server devices 16(1)-16(n), the vehicle advertisement server 17, and the communication networks 18 are described and illustrated herein, other types and numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices, apparatuses, and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 3:
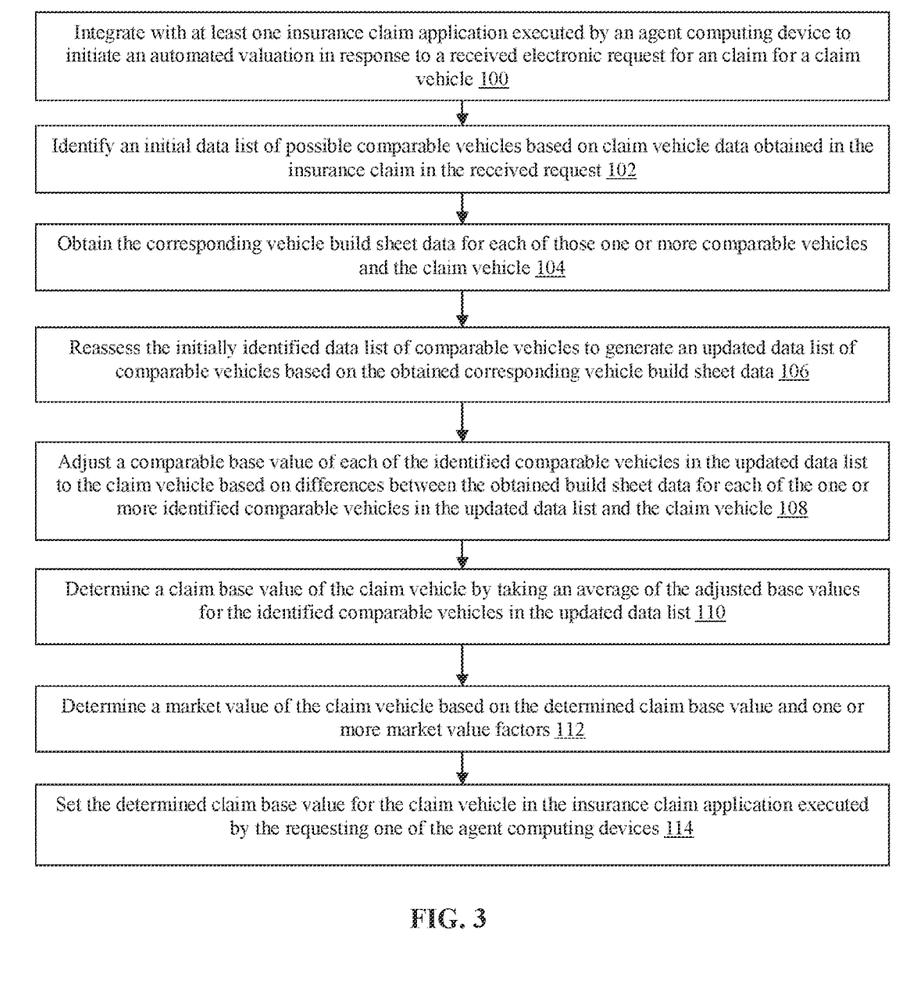
FIG. 3 is a flow chart of an example of a method for vehicle valuation utilizing automated integration of build sheet data.

An example of a method for vehicle valuation utilizing automated integration of build sheet data will now be described with reference to FIGS. 1-9. Referring more specifically to FIG. 3, in step 100 the valuation management computing apparatus 12 may integrate with at least one insurance claim application executed by a requesting one of the agent computing device 14(1)-14(n) to initiate an automated valuation in response to an electronic request for an insurance claim for a claim vehicle, although the automated valuation can be initiated in other manners.

Next, in step 102 to manage the automated valuation of the claim vehicle, the valuation management computing apparatus 12 may identify an initial data list of possible comparable vehicles based on claim vehicle data extracted from the insurance claim in the received electronic request, although other manners for identifying comparable vehicles can be used. By way of example only, the claim vehicle data used to identify comparable vehicles may include identified vehicle characteristics such as a make, a model, and a year of the claim vehicle by way of example only, although other types and/or numbers of vehicle characteristics may be used, such as vehicle configuration, current mileage, and/or equipment of the claim vehicle by way of example.

By way of example only, to identify the initial data list of one or more possible comparable vehicles, the valuation management computing apparatus 12 may conduct an automated text search of vehicle advertisement data accessible by way of example on the vehicle advertisement server 17. Next, the valuation management computing apparatus 12 may extract advertised vehicle data relating to the vehicle characteristics from the vehicle advertisement data on the vehicle advertisement server 17. Next, the valuation management computing apparatus 12 may for each advertised vehicle identify the number of matches between the extracted advertised vehicle data and the claim vehicle data for each of the identified vehicle characteristics. Next, the valuation management computing apparatus 12 may generate the initial data list of possible comparable vehicles based on the advertised vehicles with matches for the identified vehicle characteristics above a stored threshold, although other manner for generating the list could be used. Further, by way of example only, the valuation management computing apparatus 12 may identify and/or otherwise obtain corresponding vehicle identification information, such as a vehicle identification number (VIN) by way of example, for each of those identified possible comparable vehicles in the initial data list from the vehicle advertisement server 17, although the corresponding vehicle identification information could be obtained in other manners.

Next, in step 104 the valuation management computing apparatus 12 may obtain the corresponding vehicle build sheet data for each of those one or more comparable vehicles in the initial data list and the claim vehicle from one or more of the vehicle build sheet data server devices 16(1)-16(n) based on the identified corresponding vehicle identification information for each of the comparable vehicles. Build sheet data is information that may be available from the original vehicle manufacturer (OEM) that fully describes the specifications of an individual vehicle. Build sheet data provides a full and complete description of a vehicle as it was originally ordered and manufactured to include, but not limited to, the vehicle's exact configuration, standard equipment, optional features and packages. In order to determine the exact additions on a given vehicle, in this example the valuation management computing apparatus 12 utilizes all components of the VIN to determine the unique build sheet of that vehicle to ensure the accuracy of the data and to identify any vehicle which may not be comparable. By way of example only, to obtain the build sheet data, the valuation management computing apparatus 12 may utilize a VIN decoder to obtain information from the VIN, such as where the vehicle was built, the manufacturer, the vehicle brand, engine size and type, fuel type, security code, model year, assembly plant and serial number, and then use this to access build sheet data from the corresponding one of the vehicle build sheet data servers 16(1)-16(n) associated with different vehicle manufacturers. This automated implementation by the valuation management computing apparatus 12 with the decoder is specific to the VIN's Manufacturer Identifier, the vehicle attributes, check digit, model year, plant code, and sequential number. Previously, there has not been an automated technological solution for being able to access this build sheet data for enhancing the accuracy of automated vehicle valuations.

In step 106, the valuation management computing apparatus 12 may reassess the initially identified data list of comparable vehicles to generate an updated data list of comparable vehicles based on the obtained corresponding vehicle build sheet data. By way of example only, the valuation management computing apparatus 12 may extract build sheet data relating to the vehicle characteristics for each of the comparable vehicles in the initial data list. Next, the valuation management computing apparatus 12 may for each comparable vehicles in the initial data list identify the number of matches between the extracted build sheet data and the claim vehicle data for each of the identified vehicle characteristics. Next, the valuation management computing apparatus 12 may generate the updated data list of comparable vehicles based on the comparable vehicles in the initial data list with matches for the identified vehicle characteristics above the stored threshold, although other manner for generating the updated list could be used.

In step 108, the vehicle valuation calculation engine 34 of the valuation management computing apparatus 12 may adjust a comparable base value of each of the identified comparable vehicles in the updated data list to the claim vehicle based on differences between the obtained build sheet data for each of the one or more identified comparable vehicles in the updated data list and the claim vehicle, although other manners for making the adjustment could be used. Examples of this automated adjustment are illustrated in FIGS. 4-9 described in greater detail below.

In step 110, the valuation management computing apparatus 12 may determine a claim base value of the claim vehicle by taking an average of the adjusted base values for the identified comparable vehicles in the updated data list, although other manners for determining the claim base value of the claim vehicle could be used.

In step 112, the vehicle valuation calculation engine 34 of the valuation management computing apparatus 12 may determine a market value of the claim vehicle based on the determined claim base value and one or more market value factors, such as condition, refurbishments, special equipment, and/or prior damage with respect to the claim vehicle, obtained in the received request, although other types and/or numbers of additional market value factors obtained in other manners could be used.

In step 114, the valuation management computing apparatus 12 may set the determined claim base value for the claim vehicle in the insurance claim application executed by the requesting one of the agent computing devices 14(1)-14(n), although the resulting determined market value may be utilized in other manners, such as being stored for later transmission and use.

Figure 4:
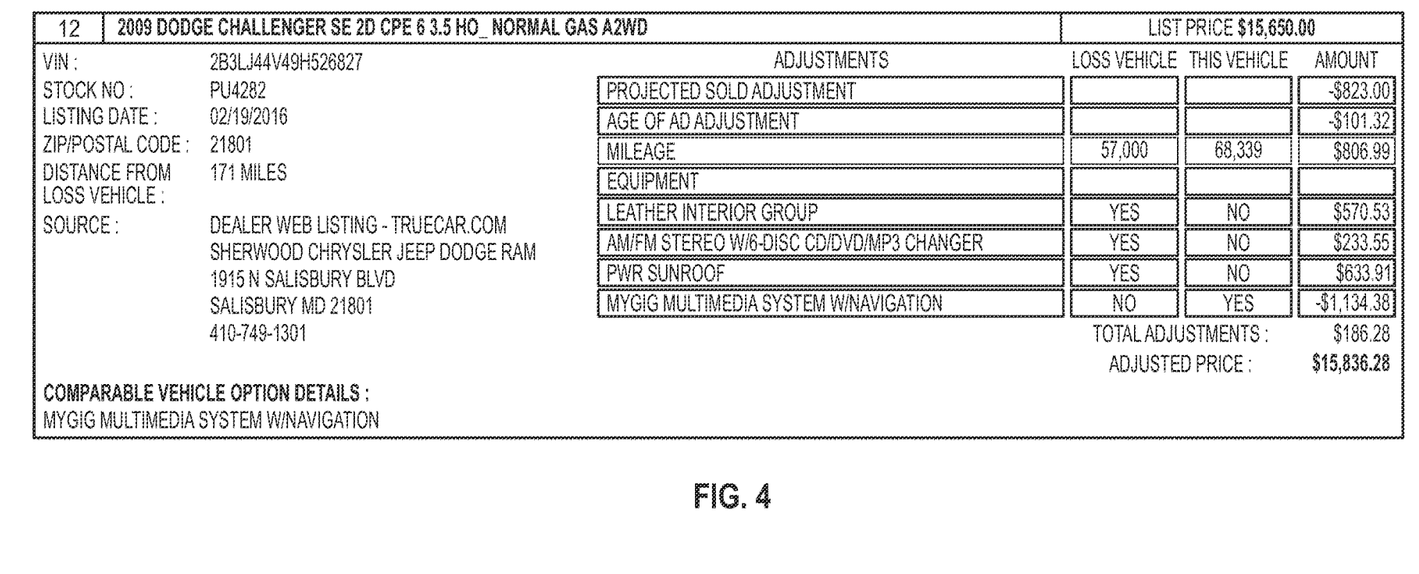
FIG. 4 is a diagram of a first example of a valuation of a comparable vehicle using a prior process.
Figure 5:
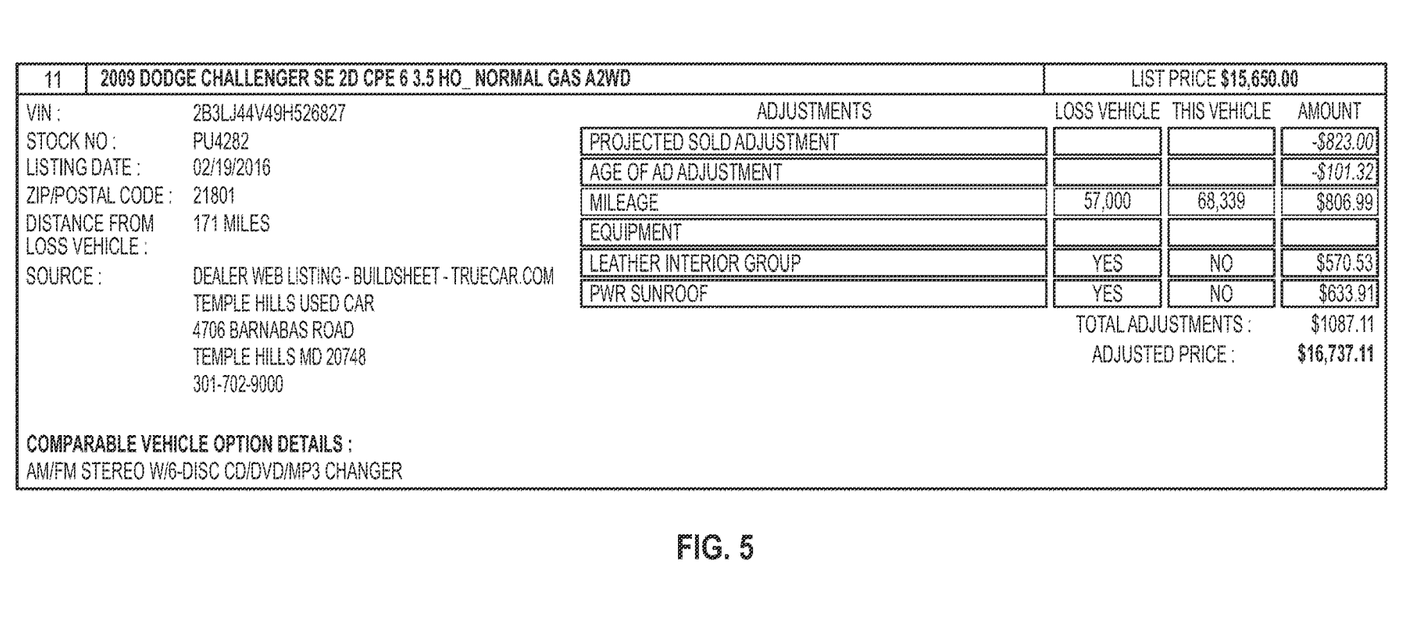
FIG. 5 is a diagram of the first example of the valuation of the same comparable vehicle as in FIG. 4 using an example of the claimed technology.

Referring to FIGS. 4 and 5, a first example of determining a valuation of the same comparable vehicle for valuation of a claim vehicle for an insurance claim using a prior automated process and then using an example of the claimed technology, respectively, are illustrated and described below. In this first example, the comparable vehicle being used to determine the valuation of the claim vehicle is a 2009 DODGE CHALLENGER SE 2D CPE 6 3.5 HO_NORMAL GAS A2WD with a VIN: 2B3LJ44V49H526827.

Using the prior automated process, the optional equipment for this comparable vehicle was populated based on a text search of a listing advertisement that incorrectly listed optional manufacturer equipment that was installed on this comparable vehicle as MYGIG MULTIMEDIA SYSTEM W/NAVIGATION as shown in FIG. 4. Accordingly, the prior automated process was not able to identify that this comparable vehicle was actually equipped by the manufacturer with an AM/FM STEREO W6-DISC CD/DVD/MP3 CHANGER, not a MYGIG MULTIMEDIA SYSTEM W/NAVIGATION. This error resulted in the application of an adjustment that brought down the value of this comparable vehicle to $15,836.28 which is not an accurate valuation of this comparable vehicle.

Next, using an example of the claimed technology, the optional equipment for this comparable vehicle was automatically obtained from the build sheet data in the manufacturer's database which correctly identified the optional equipment as an AM/FM STEREO W6-DISC CD/DVD/MP3 CHANGER, not a MYGIG MULTIMEDIA SYSTEM W/NAVIGATION as illustrated in FIG. 5. As a result, the determined value of the comparable vehicle is identified as $16,737.11 which is a more accurate valuation of this comparable vehicle.

Figure 6:
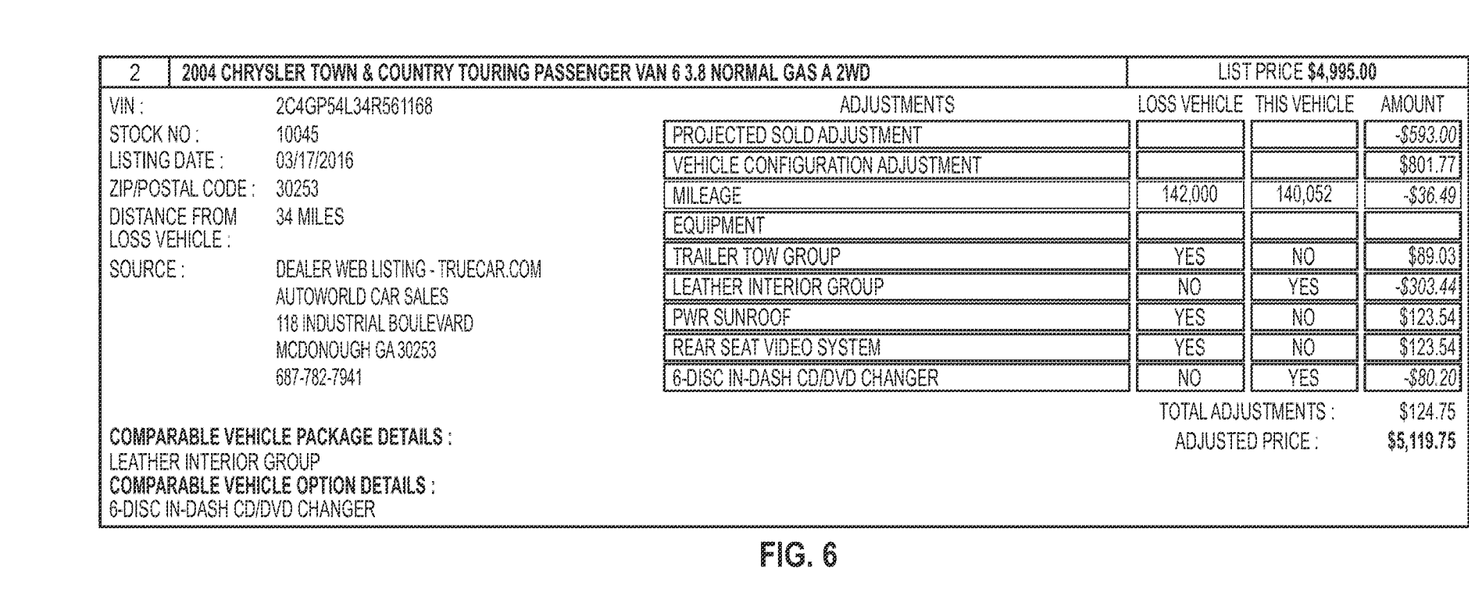
FIG. 6 is a diagram of a second example of a valuation of a comparable vehicle using a prior process.
Figure 7:
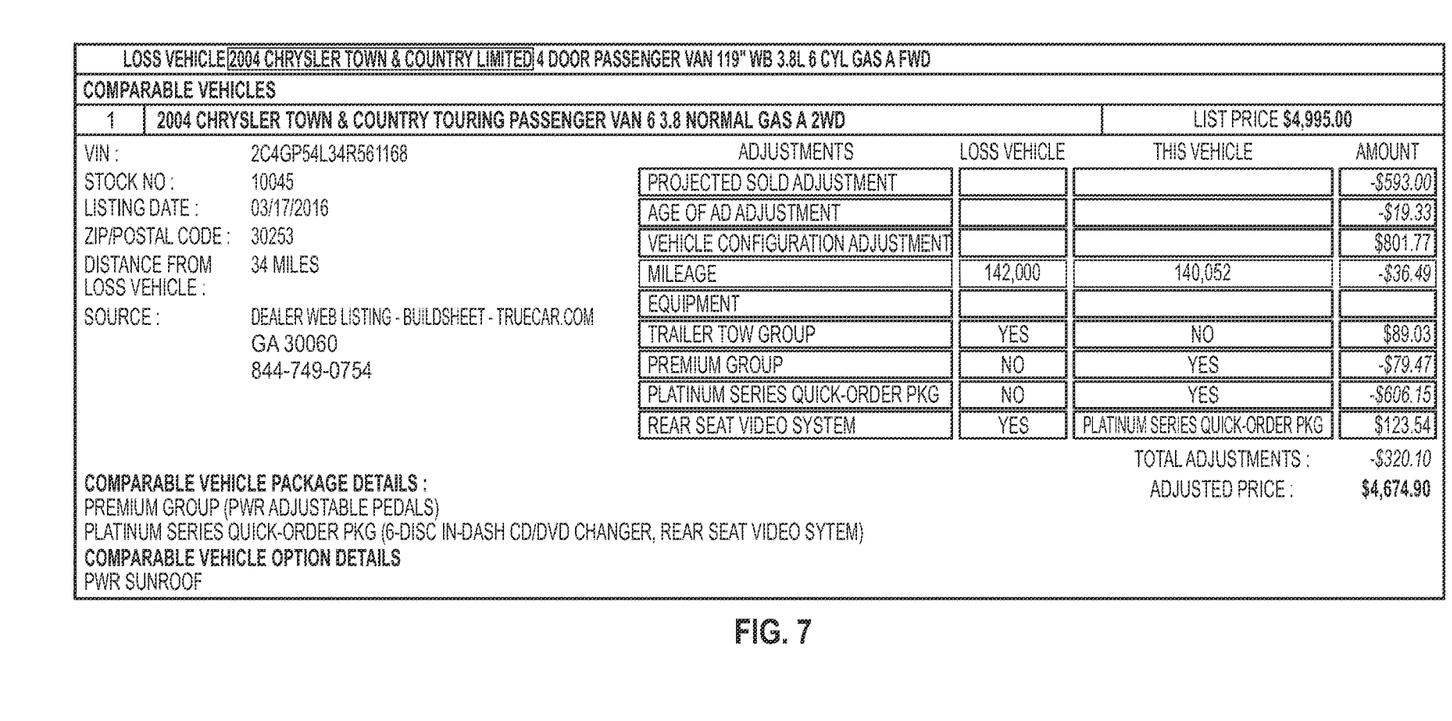
FIG. 7 is a diagram of the second example of the valuation of the same comparable vehicle as in FIG. 6 using an example of the claimed technology.

Referring to FIGS. 6 and 7, a second example of determining a valuation of the same comparable vehicle for valuation of a claim vehicle for an insurance claim using a prior automated process and then using an example of the claimed technology, respectively, are illustrated and described below. In this second example, the comparable vehicle being used to determine the valuation of the claim vehicle is a 2004 CHRYSLER TOWN & COUNTRY TOURING PASSENGER VAN 6 3.8 NORMAL GAS A2WD with a VIN: 2C4GP54L34R561168.

Using the prior automated process, the optional equipment for this comparable vehicle was populated based on a text search of a listing advertisement that incorrectly listed optional manufacturer equipment that was installed on this comparable vehicle as LEATHER INTERIOR GROUP and 6-DISC IN-DASH CD/DVD CHANGER as shown in FIG. 6. Accordingly, the prior automated process was not able to identify that this comparable vehicle was actually equipped by the manufacturer with: PREMIUM GROUP (PWR ADJUSTABLE PEDALS), PLATINUM SERIES QUICK-ORDER PKG (6-DISC IN-DASH CD/DVD CHANGER, REAR SEAT VIDEO SYSTEM), and PWR SUNROOF. This error resulted in the application of an adjustment that brought up the value of this comparable vehicle to $5,119.75 which is not an accurate valuation of this comparable vehicle.

Next, using an example of the claimed technology, the optional equipment for this comparable vehicle was automatically obtained from the build sheet data in the manufacturer's database which correctly identified the optional equipment as: PREMIUM GROUP (PWR ADJUSTABLE PEDALS), PLATINUM SERIES QUICK-ORDER PKG (6-DISC IN-DASH CD/DVD CHANGER, REAR SEAT VIDEO SYSTEM), and PWR SUNROOF. As a result, the determined value of the comparable vehicle is identified as $4,674.90 which is a more accurate valuation of this comparable vehicle.

Figure 8:
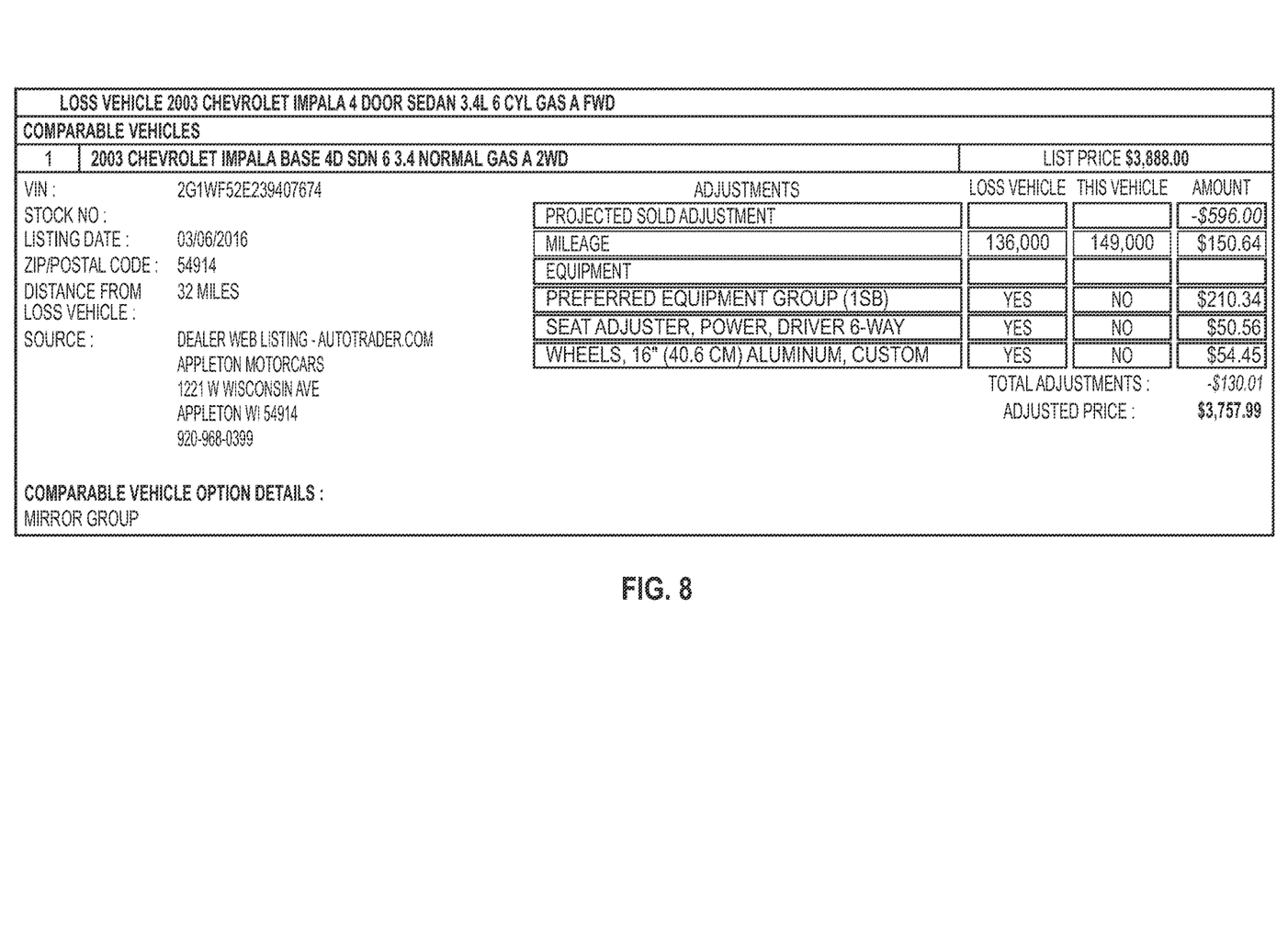
FIG. 8 is a diagram of a third example of a valuation of a comparable vehicle using a prior process.
Figure 9:
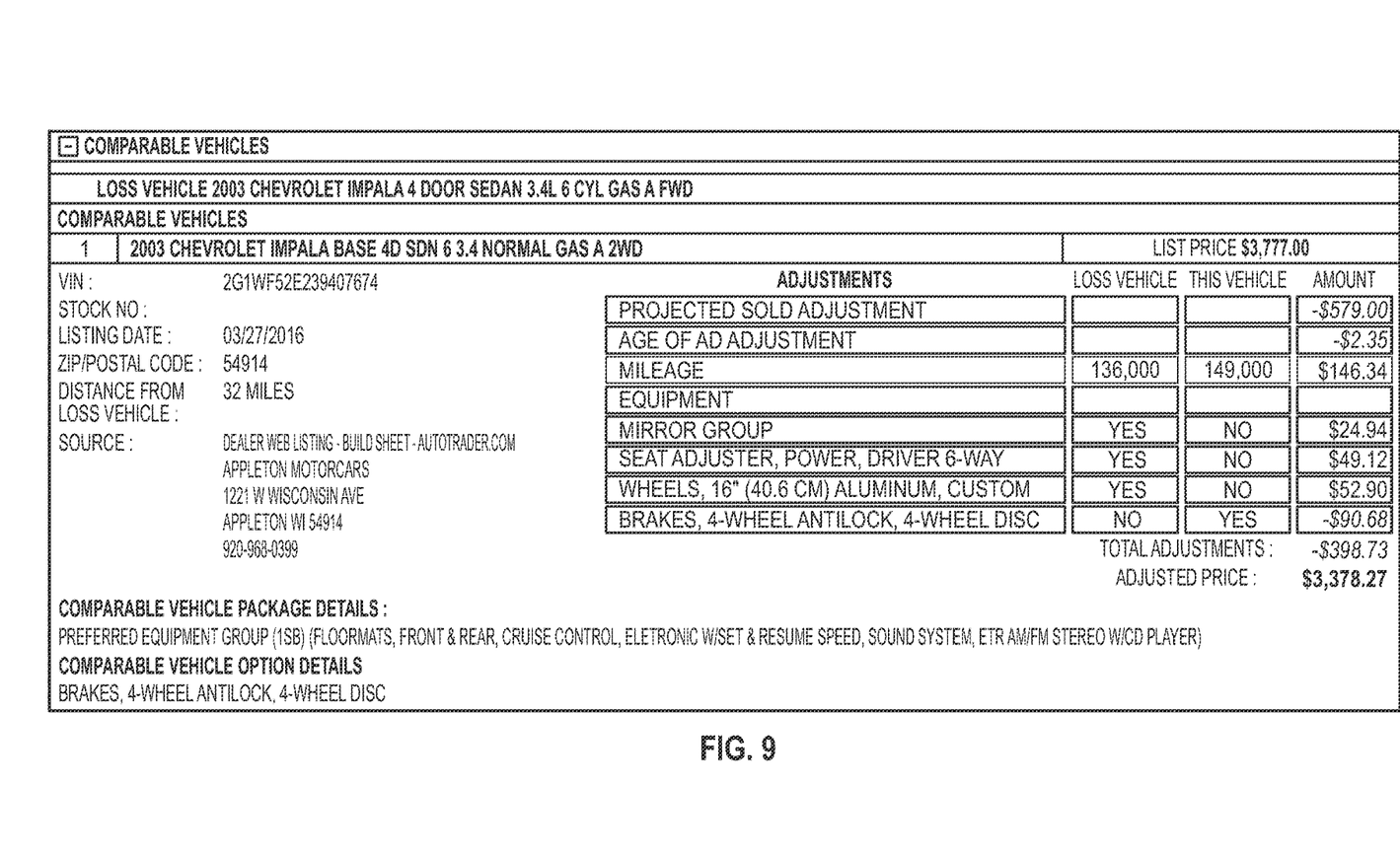
FIG. 9 is a diagram of the third example of the valuation of the same comparable vehicle as in FIG. 8 using an example of the claimed technology.

Referring to FIGS. 8 and 9, a third example of determining a valuation of the same comparable vehicle for valuation of a claim vehicle for an insurance claim using a prior automated process and then using an example of the claimed technology, respectively, are illustrated and described below. In this third example, the comparable vehicle being used to determine the valuation of the claim vehicle is a 2003 CHEVROLET IMPALA BASE 4D SDN 6 3.4 NORMAL GAS A2WD with a VIN: 2G1WF52E239407674.

Using the prior automated process, the optional equipment for this comparable vehicle was populated based on a text search of a listing advertisement that incorrectly listed optional manufacturer equipment that was installed on this comparable vehicle as MIRROR GROUP as shown in FIG. 8. Accordingly, the prior automated process was not able to identify that this comparable vehicle was actually equipped by the manufacturer with PREFERRED EQUIPMENT GROUP (1SB) (FLOORMATS, FRONT & REAR, CRUISE CONTROL, ELECTRONIC W/SET & RESUME SPEED, SOUND and BRAKES, 4-WHEEL ANTILOCK, 4-WHEEL DISC. This error resulted in the application of an adjustment that brought up the value of this comparable vehicle to $3,757.99 which is not an accurate valuation of this comparable vehicle.

Next, using an example of the claimed technology, the optional equipment for this comparable vehicle was automatically obtained from the build sheet data in the manufacturer's database which correctly identified the optional equipment as PREFERRED EQUIPMENT GROUP (1SB) (FLOORMATS, FRONT & REAR, CRUISE CONTROL, ELECTRONIC W/SET & RESUME SPEED, SOUND and BRAKES, 4-WHEEL ANTILOCK, 4-WHEEL DISC. As a result, the determined value of the comparable vehicle is identified as $3,378.27 which is a more accurate valuation of this comparable vehicle.

Accordingly, as illustrated and described by way of the examples herein, this technology significantly improves the accuracy of automated vehicle valuations. With this technology, prior errors associated with automated vehicle valuations based on vehicle advertisements from online sources are minimized if not eliminated. In particular, the automated integration of the build sheet data with this technology which is not routine or conventional in this technology space, allows for more accurate identification of comparable vehicles and allows for more accurate adjustments to the value of those comparable vehicles.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method executed by a system comprising a processor, comprising:

responsive to a received electronic request comprising a claim vehicle, integrating the claim vehicle with at least one insurance claim application externally executed by an agent computing device with programmed instructions for automated vehicle valuation;

extracting claim vehicle characteristic data from data in a received electronic claim;

determining a base data list comprising one or more comparable vehicles by obtaining vehicle advertisement data associated with a plurality of comparable vehicles by performing an automated text search with the extracted claim vehicle characteristic data associated with the claim vehicle;

determining a number of matches between the advertised vehicle characteristic data and the claim vehicle characteristic data for each comparable vehicle by comparing the advertised vehicle characteristic data associated with individual comparable vehicles with the claim vehicle characteristic data;

determining an initial data list comprising one or more comparable vehicles based on the number of matches between the advertised vehicle characteristic data and the claim vehicle characteristic data for each comparable vehicle, wherein the determined number of matches exceeds a first threshold parameter;

obtaining corresponding build sheet data from one or more build sheet data server devices for each of the comparable vehicles in the initial data list and the claim vehicle by using a decoder on a corresponding vehicle identifier of each of the comparable vehicles and the claim vehicle, the build sheet data specifying additional vehicle characteristics;

comparing the advertised vehicle characteristic data provided by the build sheet data associated with individual comparable vehicles in the initial data set with the claim vehicle characteristic data provided by the build sheet data, to determine a number of matches between the advertised vehicle characteristic data of each comparable vehicle and the claim vehicle characteristic data;

determining an updated data list comprising one or more comparable vehicles of the initial data list, based on the number of matches between the advertised vehicle characteristic data provided by the build sheet data and the claim vehicle characteristic data for each comparable vehicle provided by the build sheet data, wherein the determined number of matches exceeds a second threshold parameter;

adjusting individual comparable base values of each of the comparable vehicles in the updated data list based on the number of matches between the advertised vehicle characteristic data of each comparable vehicle and the claim vehicle characteristic data, wherein a lesser number of matches decreases the comparable base value;

determining a claim base value for the claim vehicle based on a calculated average of the individual adjusted comparable base values for each of the comparable vehicles in the updated data list; and setting the determined claim base value for the claim vehicle for the insurance claim application executed by the agent computing device.

2. The method of claim 1, further comprising:

adjusting, by the computing apparatus, the determined claim base value to a market value of the claim vehicle based on one or more market value factors; and setting, by the computing apparatus, the adjusted market value for the claim vehicle as the determined claim base value for the claim vehicle in the insurance claim application executed by the agent computing device.

3. The method of claim 2, wherein the one or more market value factors comprise market value data on one or more of condition, refurbishment, special equipment, or prior damage relating to the claim vehicle.

4. A non-transitory computer readable medium having stored thereon instructions for vehicle valuation utilizing automated integration of build sheet data, comprising executable code, which when executed by at least one processor, cause the processor to:

responsive to a received electronic request comprising a claim vehicle, integrate the claim vehicle with at least one insurance claim application;

extract claim vehicle characteristic data for the claim vehicle based on data in the claim obtained from the integrating with the at least one insurance claim application;

determine a base data list comprising one or more comparable vehicles by obtaining vehicle advertisement data associated with a plurality of comparable vehicles by performing an automated text search with the extracted claim vehicle characteristic data associated with the claim vehicle;

determine a number of matches between the advertised vehicle characteristic data against the extracted claim vehicle characteristic data for each comparable vehicle in the base data list by comparing the advertised vehicle characteristic data associated with individual comparable vehicles with the claim vehicle characteristic data to identify an initial data list of one or more comparable vehicles;

obtain corresponding vehicle identifiers for each of the comparable vehicles in the initial data list and the claim vehicle to obtain elements of vehicle information;

obtain corresponding build sheet data from one or more build sheet data server devices for each of the comparable vehicles in the initial data list and the claim vehicle by using a decoder on a corresponding vehicle identifier of each of the comparable vehicles and the claim vehicle, the build sheet data specifying additional vehicle characteristics;

determine an updated data list comprising one or more comparable vehicles of the initial data list, based on the number of matches between the advertised vehicle characteristic data provided by the build sheet data and the claim vehicle characteristic data for each comparable vehicle provided by the build sheet data, wherein the determined number of matches exceeds a threshold parameter;

adjust individual comparable base values of each of the comparable vehicles in the updated data list based on the number of matches between the advertised vehicle characteristic data of each comparable vehicle and the claim vehicle characteristic data, wherein a lesser number of matches decreases the comparable base value;

determine a claim base value for the claim vehicle based on a calculated average of the individual adjusted comparable base values for each of the comparable vehicles in the updated data list; and set the determined claim base value for the claim vehicle for the insurance claim application executed by the agent computing device.

5. The medium of claim 4, wherein the executable code, when executed by the processor, further causes the processor to:

adjust the determined claim base value to a market value of the claim vehicle based on one or more market value factors; and set the adjusted market value for the claim vehicle as the determined claim base value for the claim vehicle in the insurance claim application executed by the agent computing device.

6. A valuation management computing apparatus comprising:

a processor; and a memory coupled to the processor which is configured to be capable of executing programmed instructions stored in the memory to:

responsive to a received electronic request comprising a claim vehicle, integrate the claim vehicle with at least one insurance claim application externally executed by an agent computing device with programmed instructions for automated vehicle valuation;

extract claim vehicle characteristic data for the claim vehicle based on data in the claim obtained from the integrating with the at least one insurance claim application externally executed by the agent computing device;

determine a base data list comprising one or more comparable vehicles by obtaining vehicle advertisement data associated with a plurality of comparable vehicles by performing an automated text search with the extracted claim vehicle characteristic data associated with the claim vehicle;

determine a number of matches between the advertised vehicle characteristic data against the extracted claim vehicle characteristic data for each comparable vehicle in the base data list by comparing the advertised vehicle characteristic data associated with individual comparable vehicles with the claim vehicle characteristic data to identify an initial data list of one or more comparable vehicles;

obtain corresponding vehicle identifiers for each of the comparable vehicles in the initial data list and the claim vehicle to obtain elements of vehicle information;

obtain corresponding build sheet data from one or more build sheet data server devices for each of the comparable vehicles in the initial data list and the claim vehicle by using a decoder on a corresponding vehicle identifier of each of the comparable vehicles and the claim vehicle, the build sheet data specifying additional vehicle characteristics;

determine an updated data list comprising one or more comparable vehicles of the initial data list, based on the number of matches between the advertised vehicle characteristic data provided by the build sheet data and the claim vehicle characteristic data for each comparable vehicle provided by the build sheet data, wherein the determined number of matches exceeds a threshold parameter;

adjust individual comparable base values of each of the comparable vehicles in the updated data list based on the number of matches between the advertised vehicle characteristic data of each comparable vehicle and the claim vehicle characteristic data, wherein a lesser number of matches decreases the comparable base value;

determine a claim base value for the claim vehicle based on a calculated average of the individual adjusted comparable base values for each of the comparable vehicles in the updated data list; and set the determined claim base value for the claim vehicle for the insurance claim application executed by the agent computing device.

7. The apparatus of claim 6, wherein the processor is further configured to be capable of executing the stored programmed instructions to:

adjust the determined claim base value to a market value of the claim vehicle based on one or more market value factors; and set the adjusted market value for the claim vehicle as the determined claim base value for the claim vehicle in the insurance claim application executed by the agent computing device.

8. The apparatus of claim 7, wherein the one or more market value factors comprise market value data on one or more of condition, refurbishment, special equipment, or prior damage relating to the claim vehicle.

* * * * *